(12) United States Patent
Long et al.

(10) Patent No.: US 8,193,883 B2
(45) Date of Patent: Jun. 5, 2012

(54) ROTARY SWITCHING MECHANISM

(75) Inventors: Geoffrey A. Long, Torrance, CA (US); Felix T. Sasso, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 188 days.

(21) Appl. No.: 11/980,254

(22) Filed: Oct. 30, 2007

(65) Prior Publication Data
US 2009/0108684 A1    Apr. 30, 2009

(51) Int. Cl.
H01H 9/00 (2006.01)
H01F 7/08 (2006.01)
H01F 7/00 (2006.01)

(52) U.S. Cl. .......................... 335/179; 335/229

(58) Field of Classification Search .............. 385/16; 335/179; 251/129.15
See application file for complete search history.

(56) References Cited

U.S. PATENT DOCUMENTS

| | | | |
|---|---|---|---|
| 4,021,716 A | 5/1977 | Rue | |
| 4,998,082 A * | 3/1991 | Duimstra | 335/154 |
| 5,337,030 A * | 8/1994 | Mohler | 310/156.37 |
| 5,703,729 A * | 12/1997 | Takeda et al. | 359/821 |
| 5,751,078 A | 5/1998 | Loewenthal | |
| 6,146,044 A | 11/2000 | Calvet | |
| 6,452,732 B1 * | 9/2002 | Okada et al. | 359/813 |
| 6,467,441 B2 * | 10/2002 | Cristiani et al. | 123/90.11 |
| 6,507,257 B2 * | 1/2003 | Mohler | 335/220 |
| 6,950,569 B2 * | 9/2005 | Smith | 385/16 |
| 6,956,453 B2 * | 10/2005 | Osterberg | 335/229 |
| 6,999,647 B2 * | 2/2006 | Johnson | 385/16 |
| 7,013,057 B2 * | 3/2006 | Osterberg | 385/16 |
| 7,468,646 B2 * | 12/2008 | Osterberg | 335/179 |
| 2003/0111926 A1 * | 6/2003 | Decristofaro et al. | 310/216 |
| 2004/0145330 A1 * | 7/2004 | Maslov et al. | 318/437 |
| 2005/0054480 A1 * | 3/2005 | Ortmann et al. | 477/6 |
| 2007/0216504 A1 * | 9/2007 | Gonzalez et al. | 335/200 |
| 2007/0279168 A1 * | 12/2007 | Osterberg | 335/272 |

OTHER PUBLICATIONS

Trefoil Rotary Flexure, NASA Tech Brief, Aug. 1998, vol. 22, No. 8, JPL New Technology Report NPO-20228, Pasadena, CA.
Hexfoil Rotary Flecures, NASA Tech Brief, Jun. 1, 2002, vol. 26, No. 6, JPL New Technology Report NPO-21154, Pasadena, CA.

* cited by examiner

*Primary Examiner* — Lincoln Donovan
*Assistant Examiner* — Alexander Talpalatskiy
(74) *Attorney, Agent, or Firm* — Thorpe North & Western LLP (57) ABSTRACT

A switching system includes two or more rotary switching mechanisms for selectively moving items. The switching system may be used for switching optical elements, such as filters, into and out of an optical path, for example selectively placing one of a group of available filters into the optical path. Each of the rotary switching mechanisms has a passive torque device, including a mechanical flexure and a magnetic latch, that provides most of the torque for moving an item between a retracted position and an extended position, and vice versa. The passive torque device has a pair of null positions or detents at the retracted and extended positions. A brushless DC motor is used to provide a force to get the passive torque device out of these null positions. Thereafter the passive torque device is able on its own to provide most of the torque for movement.

19 Claims, 8 Drawing Sheets

ROTARY SWITCHING MECHANISM

This invention was made with Government support. The Government has certain rights in this invention.

BACKGROUND OF THE INVENTION

1. Technical Field of the Invention

The invention is in the general field of switching mechanisms, with specific applicability to rotary switching mechanisms, such as for switching optical devices.

2. Description of the Related Art

There is a continuing need for movement of devices in and out of locations, such as in swapping of optical filters or other optical elements in and out of an optical path. The simplest switch mechanisms do not contain any provision for reducing the reaction forces and moments. For systems that are not sensitive to vibrations or systems that do not require the switch to occur in a very short period of time, this simple approach may be adequate. However, as systems increase in performance they can become more susceptible to vibration.

In some prior systems, a reaction mass has been added to the switching mechanism. Instead of applying a torque between the moving element and the base, a torque is applied between the moving element and the reaction mass. The reaction mass and the moving element move in opposite directions, and theoretically no torque is applied to the base. This approach has various disadvantages, the most severe of which is that the mass is usually approximately equal in size and weight to the primary moving element. The added size, weight and complexity of the reaction mass make packaging difficult and add significant weight to the system. The power consumption of this type of mechanism will also be higher than an equivalent mechanism without a reaction mass. This approach has been used extensively on gimbals and beam steering mirrors.

In systems where there are at least two elements and one of them is always deployed and the rest are always retracted, the torque applied to the element that moves from deployed to retracted can be used to cancel torque of the element that moves from retracted to deployed. This approach is essentially the same as the reaction mass approach described above except that another mechanism which is mounted to a common base is used as the reaction mass. Instead of a torque applied directly between the primary moving element and the reaction mass (requiring one actuator), each of the two moving elements applies a torque to a common plate (requiring two actuators). Because the two mechanisms are rotating in opposite directions, it is possible to cancel the reaction torques resulting in a reactionless system.

In the systems described above, an actuator is usually the sole source of the torque that moves the masses from one position to another. The actuator typically is the dominant source of heat dissipated in the mechanism. In many systems, the mechanism needs to operate in a cryogenic environment and any heat that the mechanism adds needs to be removed in order to maintain that cryogenic environment. It will be appreciated that having heat sources in a cryogenic system is undesirable.

From the foregoing it will be appreciated that there is room for improvement in the general area of rotary switching mechanisms.

SUMMARY OF THE INVENTION

According to an aspect of an embodiment of the invention, a rotary switching mechanism has a motor that can apply torque through the mechanism's entire range of travel. The mechanism includes a sensor used to measure the angle of the moving element. A closed servo loop accurately controls the mechanism using the sensor in the motor. The servo loop allows the reaction torque profile of the mechanism to be precisely controlled. The servo also advantageously reduces sensitivity to parameter variations such as flexure spring constant variation and inertia mismatches between various rotary switching mechanisms that are part of a single system.

According to another aspect of an embodiment of the present invention, a rotary switching mechanism has a mechanical flexure upon which a moving element is suspended. The flexure has a moment stiffness, an axial stiffness, and a radial stiffness, that are large enough to eliminate any need for bearings in the system.

According to yet another aspect of an embodiment of the present invention, a rotary switching mechanism has a passive torque device with both mechanical and magnetic elements.

According to still another aspect of an embodiment of the present invention, a rotary switching mechanism has a passive torque device that includes a mechanical flexure and a magnetic latch. The mechanical flexure is a bearingless element. The magnetic latch is a passive magnetic latch that counteracts the flexure torque to provide a torque null in the deployed position and another torque null in the retracted position. The passive torque device may maintain itself in either the retracted or deployed position with zero power consumption. The passive magnetic latch may be non-contacting, which helps reduce wear and disturbances, as well as increasing reliability.

According to a further aspect of an embodiment of the invention, a rotary switching mechanism includes: a motor; and a passive torque device operatively coupled to the motor. The passive torque device includes: a mechanical flexure; and a magnetic latch. The passive torque device has an extended position null at an extended position and a retracted position null at a retracted position. The passive torque device has a torque versus angle profile between the nulls that passively drives the torque device from adjacent to the extended position to adjacent to the retracted position, and vice versa.

According to a still further aspect of an embodiment of the invention, a rotary switching system includes: multiple rotary switching mechanisms, wherein each of the rotary switching mechanisms includes: a motor; and a passive torque device operatively coupled to the motor; wherein the passive torque device includes: a mechanical flexure; and a magnetic latch; wherein the passive torque device has an extended position null at an extended position and a retracted position null at a retracted position; and wherein the passive torque device has a torque versus angle profile between the nulls that passively drives the torque device from adjacent to the extended position to adjacent to the retracted position, and vice versa. The rotary switching mechanisms are coupled to respective optical elements such that the optical elements can be selectively extended into an optical path. The rotary switching mechanisms are configured to retract one of the rotary switching mechanisms when another of the rotary switching mechanisms is deployed.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A switching system includes two or more rotary switching mechanisms for selectively moving items. The switching system may be used for switching optical elements, such as filters, into and out of an optical path, for example selectively placing one of a group of available filters into the optical path. Each of the rotary switching mechanisms has a passive torque device, including a mechanical flexure and a magnetic latch, that provides most of the torque for moving an item between a retracted position and an extended position, and vice versa. The passive torque device has a pair of stable null positions or detents at the retracted and extended positions. The passive torque device maintains the switching mechanism in these null positions without application of an external force. A brushless DC motor is used to provide a force to get the passive torque device out of these null positions. Thereafter the passive torque device is able on its own to provide most of the torque for movement between the extended and retracted positions. A sensor is used as part of a feedback loop to control operation of the motor, to provide proper timing of application of the force of the motor to get the passive torque device to exit and enter the detents when movement of the optical device is desired. The mechanical element that is part of the passive torque device is a bearingless mechanical flexure that has a high axial and radial stiffness, and maintains a substantially invariant position of its axis of rotation throughout its range of rotation.

Figure 1:
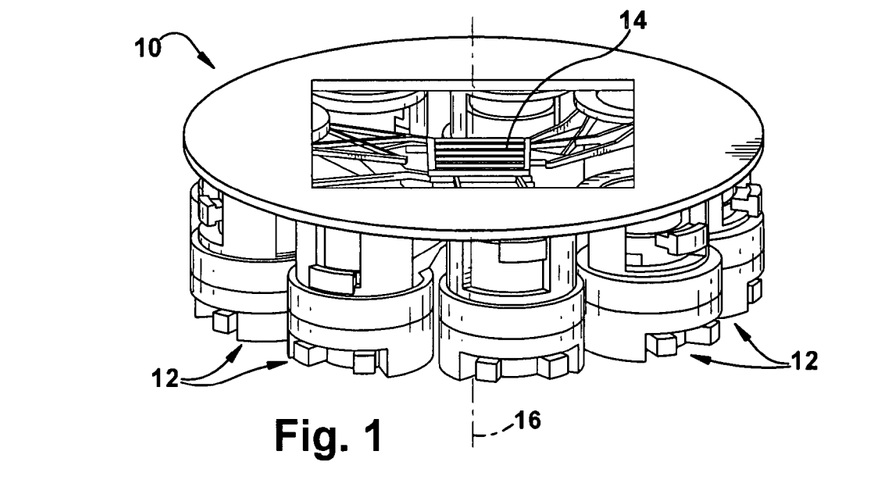
FIG. 1 is an oblique view of a switching system in accordance with an embodiment of the present invention.
Figure 2:
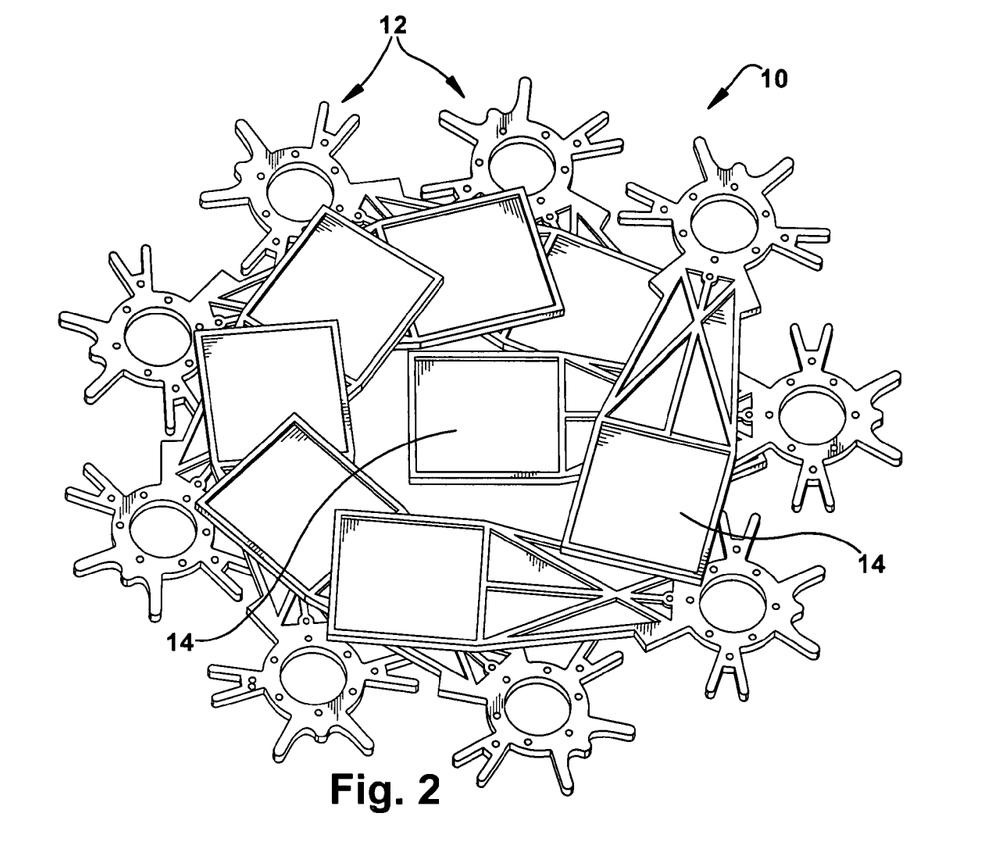
FIG. 2 is a plan view showing certain aspects of the system of FIG. 1.

FIGS. 1 and 2 show a switching system 10 that includes a plurality of rotary switching mechanisms 12 each coupled to one of a plurality of items 14 to be selectively moved. In the illustrated embodiment the system 10 is used for switching to place one of a series of optical filters or other optical devices (the items 14) into a central optical path 16. However, it will be appreciated that the switching system 10 may be used in any of a wide variety of applications.

In the specific embodiment of the switching system 10 shown in FIGS. 1 and 2, the system 10 is capable of switching between a currently deployed or extended one of the items 14, and any of the other of the items 14, which are maintained in a retracted state. In the illustrated embodiment only one of the items 14 is ever extended or deployed at any one time. Swapping of items involves simultaneously retracting the deployed item 14, and extending one of the other items 14. However, it will be appreciated that a wide variety of other configurations may be employed. The number of mechanisms 12 and items 14 may vary from what is shown in the illustrated system 10.

Figures 3, 4:
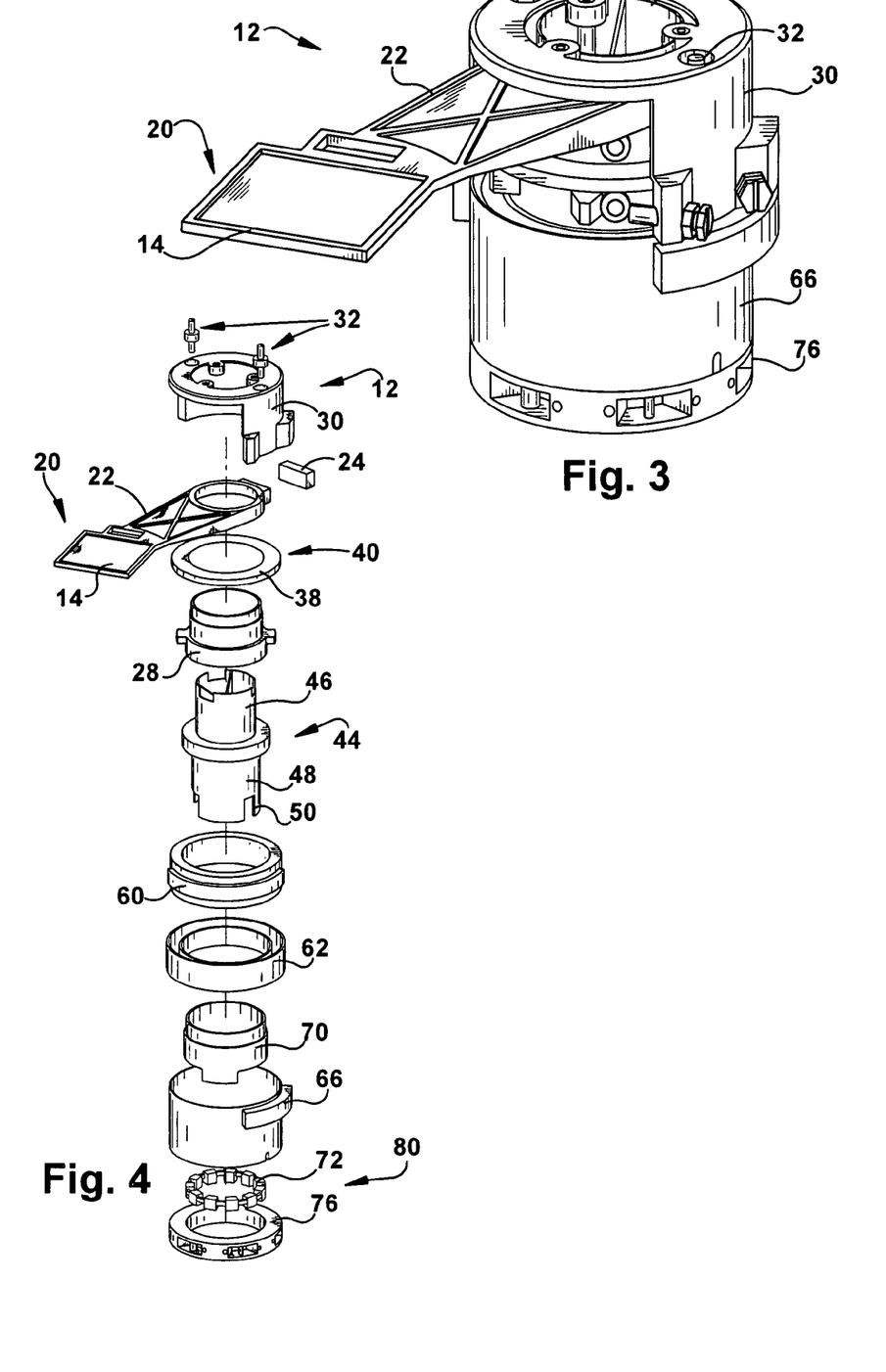
FIG. 3 is an oblique view of a rotary switching mechanism that is part of the system of FIG. 1.
FIG. 4 is an exploded view of the rotary switching mechanism of FIG. 3.
Figure 5:
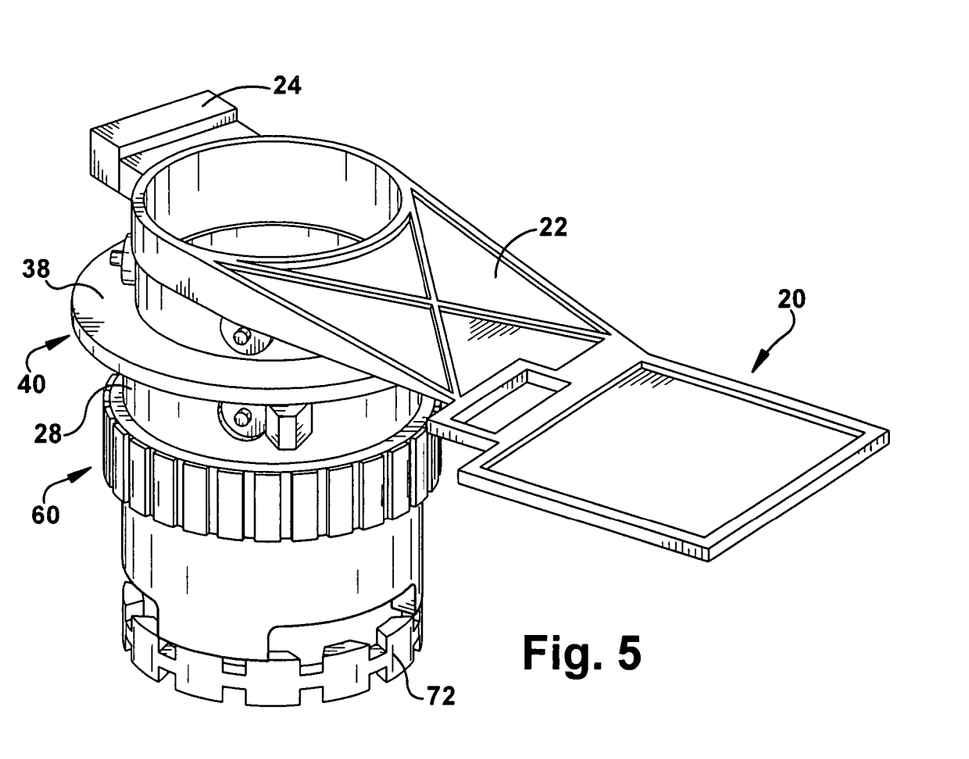
FIG. 5 is an oblique view showing the moving parts of the rotary switching mechanism of FIG. 3.

FIGS. 3-5 show details of one of the rotary switch mechanism 12. The item 14, an optical element such as an optical filter, is held in an aperture 20 in an optical element arm 22. The optical element arm 22 may be made from a suitable material with high stiffness, for example beryllium. An arm counterweight 24 is placed on the optical element arm 22 diametrically opposed to the optical filter 14, in order to balance the optical element arm 22. The arm counterweight 24 may be made from tungsten, and counterbalances the cantilevered optical element arm 22.

The optical element arm 22 is attached to an optical element arm cylinder 28, within an upper housing 30. The parts of the switching mechanism 12 may be grouped according to whether they rotate or remain stationary when the filter 14 is retracted or extended. Like the optical element arm 22, the optical arm cylinder 28 rotates during extension or retraction. Parts that rotate during extension or retraction are shown in FIG. 5. The optical element arm 22 is secured to the optical element arm cylinder 24 by means of pins. It will be appreciated that any of a variety of suitable mechanical and other mechanisms may be used to secure the optical element arm 22 to the optical element arm cylinder 28.

The optical element arm cylinder 28 essentially functions as a spacer providing the ability to locate the optical element arms 22 of different switching mechanisms 14 at different heights (different longitudinal or axial locations). It will be appreciated that it may be desirable to have the filters or other items 14 of different switching mechanisms 12 at different heights, so that they may overlap without colliding with one another.

The optical element arm cylinder 28 has ten trimweight locations that allow for nulling of static imbalance and products of inertia, and for matching of moments of inertia between different switching mechanisms 12 of the system 10

(FIG. 1). The optical element arm cylinder 28 may have suitable features that limit the travel of the optical element 14.

Figure 6:
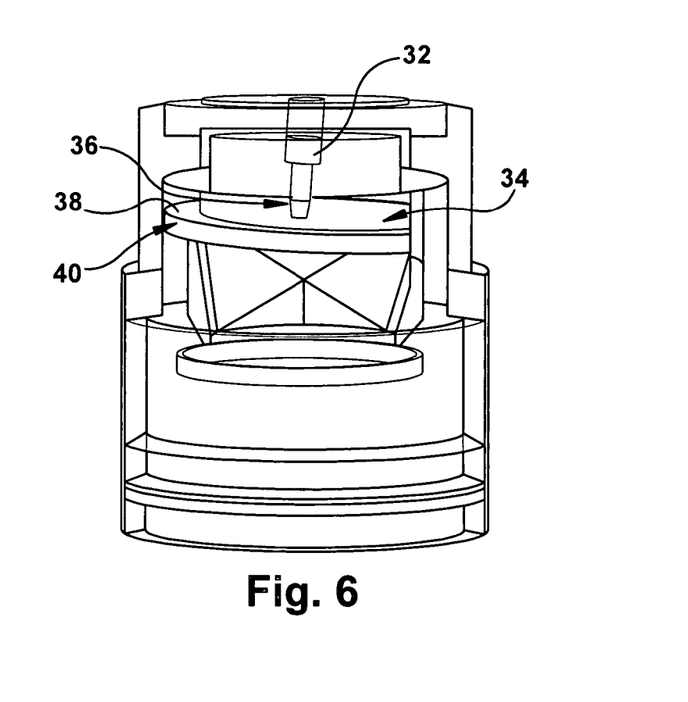
FIG. 6 is a cut away view of certain parts of the rotary switching mechanism of FIG. 3, showing the parts used for measuring angular orientation of the system.

In contrast to the optical element arm 22 and the optical element arm cylinder 28, the upper housing 30 remains stationary during extension or retraction of the filter 14. The upper housing 30 has a pair of eddy current sensors 32 mounted in it to detect rotation of rotating parts of the switching mechanism 12. With reference now, in addition to FIG. 6, the eddy current sensors 32 detect rotation by sensing a change in an air gap 34 between an eddy current sensor head 36 and a top surface 38 of a wedged disk 40. The wedged disk 40 is an annular piece having variable thickness. The top surface 38 is angled such that rotation of the wedged disk 40 changes the air gap 34. This change is picked up by the eddy current sensors 32, allowing for simple and accurate determination of the position of the optical element 14. A wide variety of suitable sensors may be used, including sensors marketed by Kaman. The wedged disk 40 is attached to the optical element arm cylinder 28.

A mechanical flexure 44 runs the entire length of the rotary switching mechanism 12. The flexure 44 has a top portion 46, a middle portion 48, and a bottom portion 50. In operation, the middle flexure portion 48 rotates, while the top flexure portion 46 and the bottom flexure portion 50 remain stationary. The flexure 44 provides mechanical resistance to rotation away from a central null point that is mid-way between a retracted position and an extended or deployed position. As discussed in greater detail below, this mechanical resistance may be used in combination with other parts of the rotary switching mechanism 12 to move the optical element 14 from a deployed position to a retracted position, and vice versa. Desirable characteristics of the flexure 44 include high axial and radial stiffness. In addition, it is desirable that the central compliant axis of the flexure 44 be substantially stationary throughout movement of the middle flexure portion 48. Also it is desirable that the flexure 44 is a bearingless part, and that it be reliable. Eliminating bearings eliminates friction, increases reliability, increases cleanliness, and eliminates issues with bearings at cryogenic temperatures.

The upper housing 30 is attached to the top flexure portion 46. The upper housing 30 contains mounting features that are used to hold the stationary parts of the rotary switching mechanism 12 fixed with respect to a next higher assembly.

A brushless DC motor 60 is attached to the middle flexure portion 48, to provide torque as necessary for rotating the middle flexure portion 48. As described in greater detail below, the rotary switching mechanism 12 is designed to largely passively extend or retract the optical element 14. However, the brushless DC motor 60 is used to either initiate extension or retraction, or to retain the rotary switching mechanism 12 in an extended or retracted position.

A motor spacer 62 is used to provide proper fit of the brushless DC motor 60 within a lower housing 66. A latch cylinder 70 is attached at its top end to the middle flexure portion 48. The bottom end of the latch cylinder 70 is coupled to a latch paddle 72.

The latch paddle or rotor 72 is surrounded by a latch field assembly or stator 76. The latch paddle 72 and the latch field assembly 76 together constitute a magnetic latch 78. The magnetic latch 78 uses magnetic forces to provide a variable torque based on the angle of the optical element 14. As the optical element 14 rotates the latch paddle 72 rotates as well. This moves the latch paddle 72 relative to the latch field assembly 76, which remains stationary and attached to the stationary lower housing 66. The magnetic latch 78 is on an exposed end of the rotary switching mechanism 12, in order to provide access for purposes of making adjustments. Details of the latch paddle 72 and the latch field assembly 76 are discussed below.

The flexure 44 and the magnetic latch 78 together form a passive torque device 80. That is discussed in greater detail below, the passive torque device 80 has a pair of null positions, sometimes referred to herein as detents, at the extended and retracted positions of the rotary switching mechanism 12. The passive torque device 80 provides a source of stored energy that allows the moving element to switch between the two operating positions (extended and retracted) with a minimum of additional torque added by the motor 60. The torque versus deflection angle profiles of the flexure 44 and the magnetic latch 78 may be optimized so that a minimum of additional torque is necessary from the motor 60.

Figure 7:
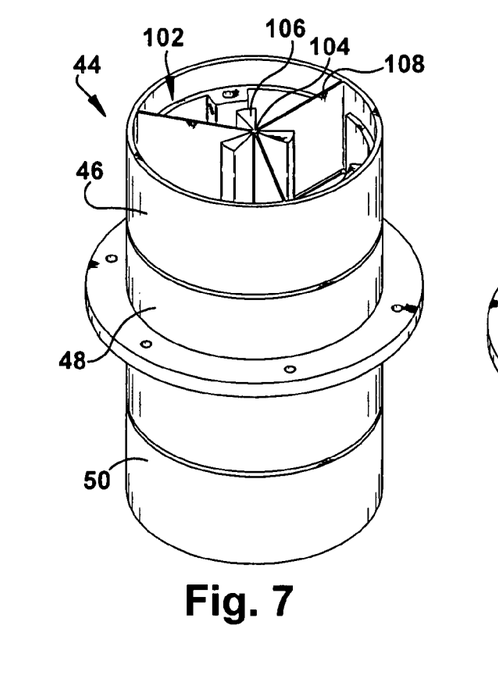
FIG. 7 shows a first embodiment mechanical flexure usable with the rotary switching mechanism of FIG. 3.
Figure 8:
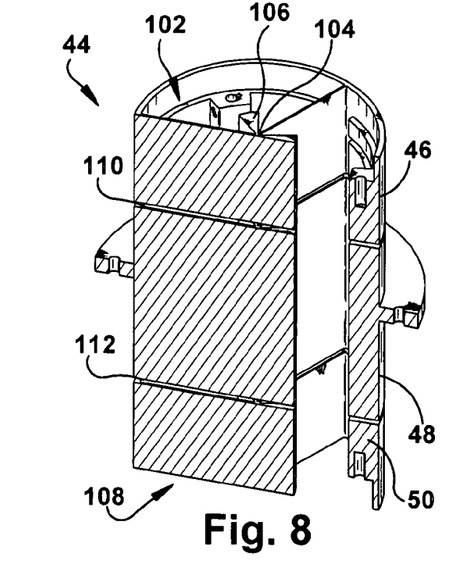
FIG. 8 shows a cutaway view of the mechanical fixture of FIG. 7.

FIGS. 7 and 8 illustrate details of one example embodiment of the flexure 44. The flexure shown in FIGS. 7 and 8 is a three-segment flexure with segments corresponding to each of the flexure portions 46, 48, and 50. The flexure 44 has three blades (foils) 102. The blades 102 are arranged axisymmetrically about a central axis 104 of the flexure 44. The blades 102 meet and are connected at the central axis 104. Each of the blades 102 extends from the central axis 104 radially outward to the housing of the flexure 44. Each of the blades 102 is balanced about the axis 104, having a thickened stub 106 diametrically opposed to a flat portion 108. The stub 106 provides structural integrity for the blade 102

The blades 102 each have an upper gap 110 and a lower gap 112. The upper gap 110 is located at the boundary between the top flexure portion 46 and the middle flexure portion 48. The lower gap 112 is located at the boundary between the middle flexure portion 48 and the bottom flexure portion 50. The presence of the gaps 110 and 112 allow the portions 46-50 of the flexure 44 to rotate relative to one another. Rotation causes twisting of the blades 102, specifically twisting of the stubs 106. Thus mechanical forces within the flexure 44 resiliently resist this twisting and provide a torque directed toward restoring the flexure 44 to its untwisted state.

The flexure 44 may utilize any of a variety of suitable materials, for example being made out of a suitable piece of metal. All of the blades 102 may be made as a unitary integral piece out of a single piece of metal. Sink electrodischarge machining may be used to manufacture the blades 102.

Figure 9:
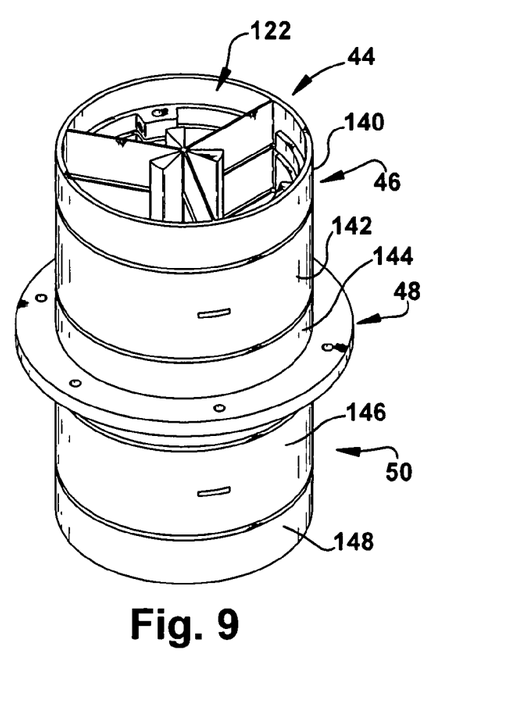
FIG. 9 shows a second embodiment mechanical flexure usable with the rotary switching mechanism of FIG. 3.
Figure 10:
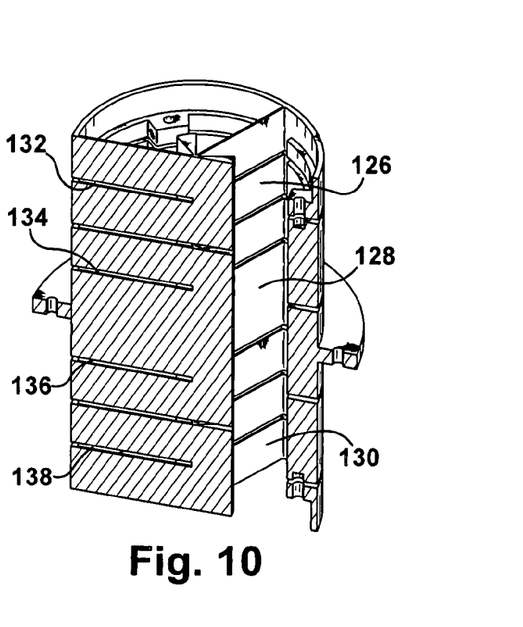
FIG. 10 shows a cutaway view of the mechanical fixture of FIG. 9.

FIGS. 9 and 10 show another embodiment of the flexure 44, a five-segment flexure. The five-segment flexure shown is FIGS. 9 and 10 has three blades (foils) 122. The blades 122 have the same cross sectional shape as the blades 102, and are arranged axisymmetrically about a central axis 124 in a manner similar to that of the blades 102. As best seen in FIG. 10, the blades 122 each have three separate segments: a top blade segment 126, a middle blade segment 128, and a bottom blade segment 130. The top blade segment 126 has a gap 132 in it. The middle blade segment 128 has a pair of gaps 134 and 136. The bottom blade segment 130 has a gap 138. The flexure 44 is able to twist along any of the gaps 132, 134, 136, and 138. Thus the flexure 44 is divided into five segments: a pair of top segments 140 and 142, which make up the top flexure portion 46; a central segment 144, which constitutes the middle flexure portion 48; and a pair of bottom segments 146 and 148, which together form the bottom flexure portion 50.

Figure 11:
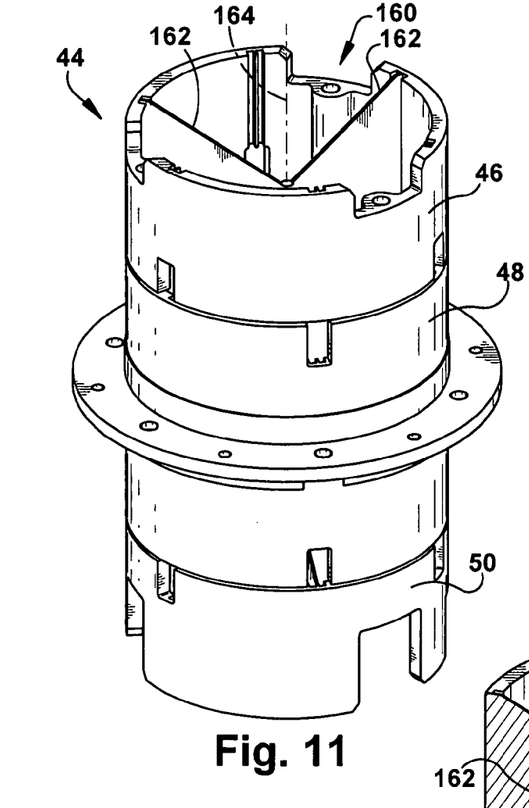
FIG. 11 shows a third embodiment mechanical flexure usable with the rotary switching mechanism of FIG. 3.
Figure 12:
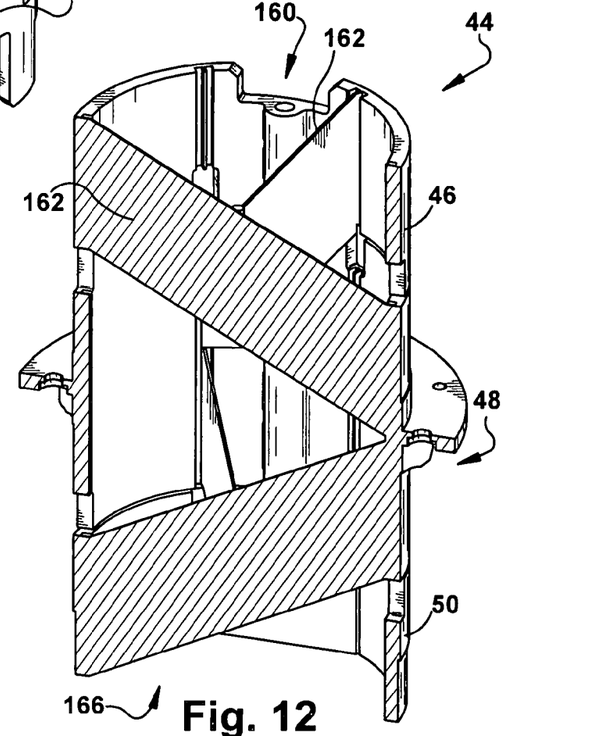
FIG. 12 shows a cutaway view of the mechanical fixture of FIG. 11.

FIGS. 11 and 12 show yet another embodiment of the flexure 44, a hexfoil flexure. The hexfoil flexure 44 shown in FIGS. 11 and 12 is a three-segment flexure. The top flexure portion 46 and the middle flexure portion 48 are coupled together by a hexfoil blade (foil) configuration 160. In the hexfoil blade configuration 160 six blades (foils) 162 emanate from a common central axis 164. The blades 162 are spread symmetrically about the axis 164. The blades 162 are angled alternately upwardly and downwardly as they emanate from the axis 164. Thus three of the blades 162 are connected to the top flexure portion 46, and the other three of the blades 162 are connected to the middle flexure portion 48. Similarly a second hexfoil blade (foil) configuration 166 is used to couple the middle flexure portion 48 and the bottom flexure portion 50.

The hexfoil blade configurations 160 and 166 may be made from a single piece of material through a suitable machining process. An example of a suitable machining process for making the hexfoil blade configurations is sink electrodischarge machining.

The hexfoil flexure 44 shown in FIGS. 11 and 12 has been found to have lower peak stress for a given size and deflection angle, in comparison with the trefoil configurations shown in FIGS. 7-10. The flexure 44 shown in FIGS. 11 and 12 is also found to have suitable characteristics in terms of stiffness, and in terms of torque levels when rotated.

Figure 13:
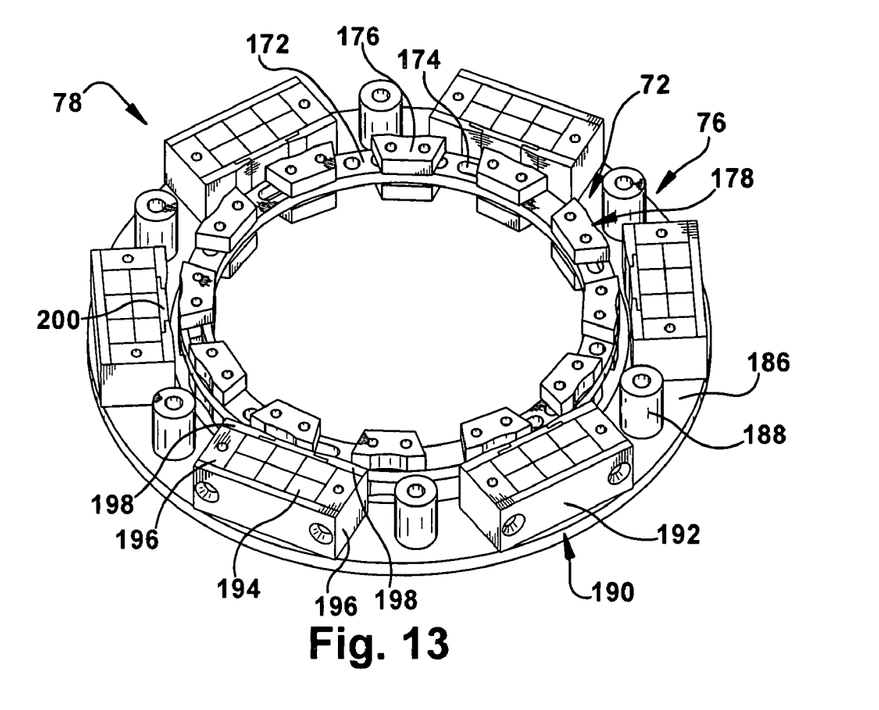
FIG. 13 is an oblique view of some parts of the magnetic latch of the rotary switching mechanism of FIG. 3.

Turning now to FIG. 13, details of the magnetic latch 78 are now described. The latch paddle or rotor 72 has a rotor ring 172, which may be made from a suitable aluminum alloy. The rotor ring 172 has a series of slots 174 symmetrically spaced along a radius of the rotor ring 172. Each of the slots is configured to receive a pair of rotor pole pieces 176, with one of the pole pieces 176 above the rotor ring 172, and the other of the pole pieces 176 below the rotor ring 172. The pole pieces 176 may be secured to the rotor ring 172 by use of suitable fasteners. There are twelve pairs of the pole pieces 176 spaced around the rotor 172. The pole pieces 176 may be in two groups of six pole pieces each, that with pieces of the groups alternating in a circumferential direction about the rotor 172. The pole pieces 176 each group may be substantially axisymmetrically spaced from each other around the rotor 172. Relative positioning of the groups of the pole pieces 176 may be used to independently adjust the location of nulls of the magnetic latch 78. It will be appreciated that other configurations are possible for the pole pieces 176. Position of the pairs of pole pieces 176 may be adjusted by moving them along the slots 174.

The rotor pole pieces 176 each have a dimple 178 along their radially outward face, the surface of the pole piece 176 that faces the latch field assembly 76. The rotor pole pieces 176 are made of a suitable magnetic material. Examples of such suitable materials include nickel-plated C1006 steel and a cobalt-iron alloy marketed as HIPERCO 50A alloy.

The latch field assembly or stator 76 has a lower plate 186. The lower plate 186 may be made of a suitable material such as aluminum. A similar upper plate is omitted from FIG. 13 for purposes of illustration. A series of spacers 188 is used to separate the upper plate from the lower plate. The spacers 188 are made of a non-magnetic material, for example being made of 316 stainless steel.

The operative parts of the latch field assembly 76 are six stator magnet assemblies 190, spaced in a circumferential direction around the lower plate 186. The stator magnet assemblies 190 may be, but are not necessarily, evenly circumferentially spaced around the lower plate 186. The stator magnet assemblies 190 are spaced alternating with the spacers 188. Each of the stator magnet assemblies 190 includes a non-magnetic back plate 192, made of a non-magnetic material such as 316 stainless steel. Mounted on the back plate 192 is a magnetic block 194, made of a suitable material such as 35 MGOe neodymium iron boron (NdBFe). Another suitable strong magnetic material is samarium cobalt.

Stator pole pieces 196 and 198 are at the sides of the magnetic block 194, and cover part of the radially inner face of the magnetic block 194, the face of the magnetic block 194 directed toward the rotor pole pieces 176. The rest of the inner face of the magnetic block 194 is covered by a non-magnetic face piece 200. The pole pieces may be made of the same material that is used to make the rotor pole pieces 176. The pole pieces of 196 and 198 function as field shapers to shape the magnetic field from the magnetic block 194.

Functionally, the stator magnetic assemblies 190 act like horseshoe magnets. When the rotor pole pieces 176 are far out of alignment with the centers of the stator magnet assemblies 190, there is little force on the latch paddle 172 from the latch field assembly 76. However, when the rotor pole pieces 176 are close to centers of the magnet assemblies 190 (close to the face pieces 200), the stator magnet assemblies 190 exert a strong pull on the rotor pole pieces 176, tending to pull the rotor pole pieces 176 to center the pole pieces 176 in front of the magnet assemblies 190. The magnetic latch 78 can be configured to utilize this torque profile to work in conjunction with the mechanical flexure 44 to provide a desired torque versus angle profile for the passive torque device 80.

Figure 14:
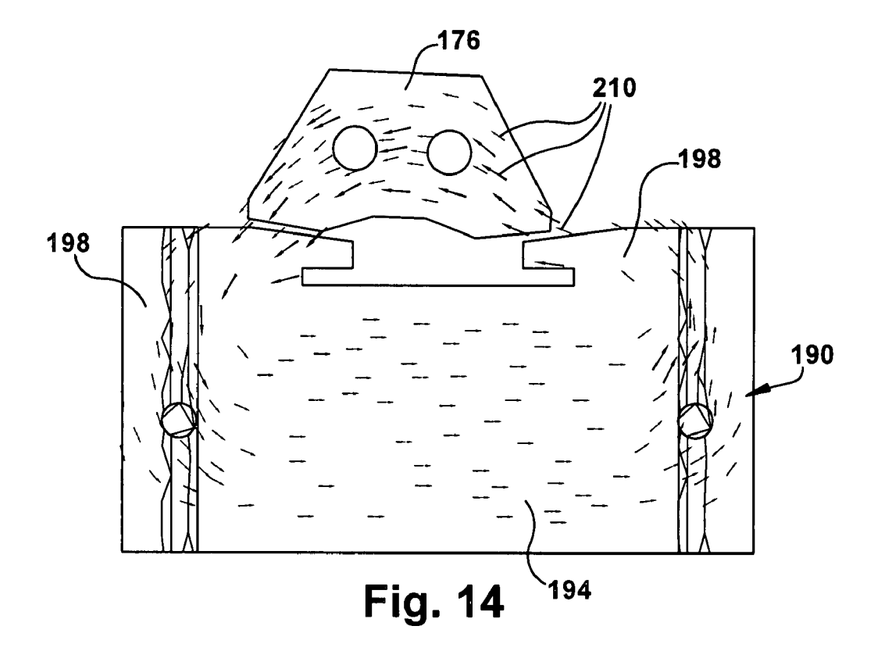
FIG. 14 is an illustration showing magnetic field lines of a coupling between a stator magnetic assembly and a rotor pole piece of the magnetic latch.

FIG. 14 shows an example of this coupling between one of the stator magnet assemblies 190 and one of the rotor pole pieces 176. Magnetic field lines 210 proceed along the two magnetic parts, magnetically coupling them together.

The magnetic latch 78 advantageously does not involve any contact between the moving latch paddle 72 and the stationary latch field assembly 76. This provides a frictionless method for controlling torque within the passive torque device 80. In addition, the adjustable portions of the latch paddle 72 allow the strength of latch and the location of the two null positions to be moved to their optimum locations. Thus the design of the magnetic latch 78 is adaptable to the potentially large variation in magnetic components. Further, another advantage is that the magnetic latch 78 is completely passive and does not require any control signals or power.

Figure 15:
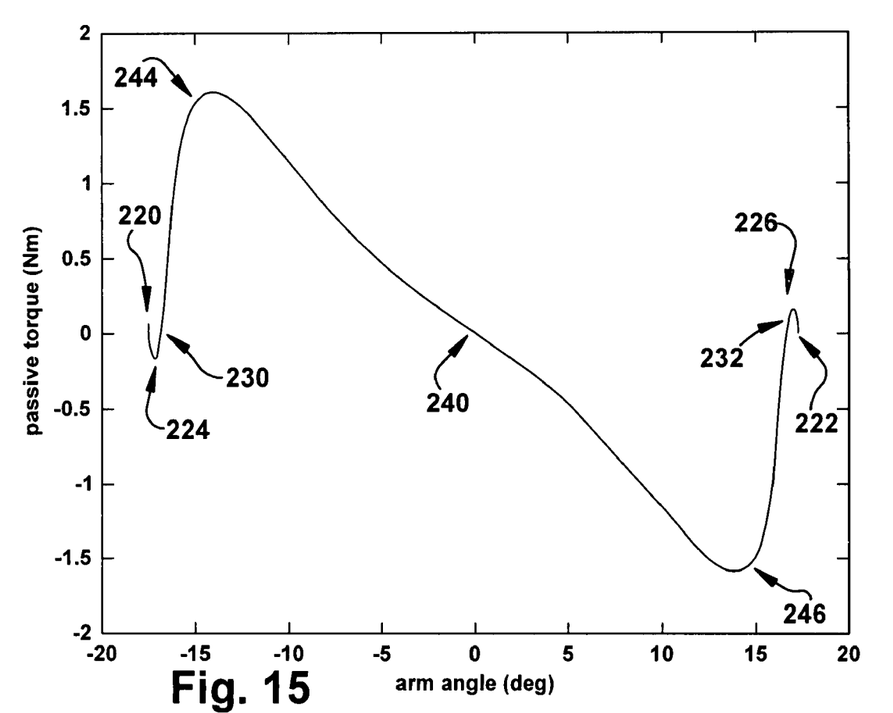
FIG. 15 is a graph showing torque as a function of angle for the passive torque device of the rotary switching mechanism of FIG. 3.

FIG. 15 illustrates the torque profile as a function of angle for one embodiment of the passive torque device 80. The torque is plotted in FIG. 15 as a function of angle. The torque shown is a combination of the torque from the flexure 44 and the torque from the magnetic latch 80. The torque profile for the passive torque device 80 has five null points, angular positions where the torque produced by the passive torque device 80 is zero. At the far left and far right of the graph are stable null operating positions 220 and 222. The stable null operating positions 220 and 222 correspond to the extended and retraced positions of the optical device 14 (FIGS. 3-5). These are stable positions in that small deviations in the arm angle of the optical element arm 22 (FIGS. 3-5) will cause the passive torque device 80 to produce torques that cause a return to the same stable null operating position 220 or 222. In order to get the system out of the stable null 220 and 222, sufficient external force must be applied to overcome detent humps 224 and 226, which represent the magnitude of the passive stabilizing torques in the vicinity of the stable null operating positions 220 and 222, respectively.

Unstable nulls 230 and 232 are located inward from the stable nulls 220 and 222. Although the unstable nulls 230 and 232 are points at which the passive torque device 80 provides zero torque, the unstable nulls 230 and 232 are not suitable as merely passive operating positions. This is because any deviation from the unstable nulls 230 and 232 will result in further movement of the optical element arm 22. For example, a slight reduction in the arm angle from the unstable null 230 will cause a torque that will push the arm to the stable null 220. A slight increase of arm angle from the unstable null 230 will result in a positive torque from the passive torque device 80, which will cause the optical element arm 22 to spontaneously move to the other unstable null 232.

The passive torque device 80 also has a central stable null 240. The central stable null 240 is also a null position of both the mechanical flexure 44 and the magnetic latch 78. The central stable null 240 is not utilized as an operating point.

The shape of the torque profile of the passive torque device 80 has a pair of high torque regions 244 and 246. The high torque regions 244 and 246 are located close to the unstable nulls 230 and 232. These high torque regions 244 and 246 provide large amounts of torque soon after the optical element arm 22 is moved away from the detent positions. This aids in rapidly accelerating the optical element arm 22, providing rapid extension and retraction. The torque to slow down the optical element arm 22 is provided near its destination, at the other high torque region 244 or 246.

The torque profile illustrated in FIG. 15 is symmetric about a central zero angle (the central null 240). However, it will be appreciated that an asymmetric profile may be used instead.

In an alternative configuration, the unstable nulls 230 and 232 may be used as operating positions for the rotary switching mechanism 12. Since these operating points would be unstable points, the motor 60 (FIG. 4) would be required to provide a torque to maintain the system at the unstable nulls 230 and 232. However, this disadvantage of requiring some constant motor input would be offset at least to some extent by the advantage of not requiring motor input to overcome the detent humps 224 and 226. It is possible in some system configurations the overall power required for operating the motor 60 may be lessened by using the unstable nulls 230 and 232 as operating points, rather than using the stable null 220 and 222.

Figure 16:
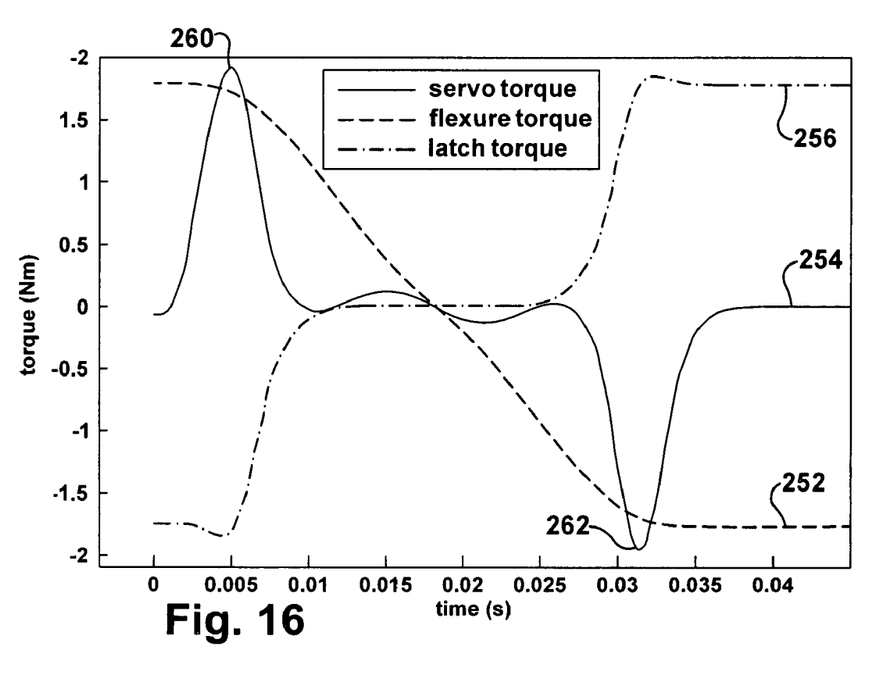
FIG. 16 is a graph showing torque versus time for various parts of the rotary switching mechanism of FIG. 3 during an extension or retraction operation.

FIG. 16 is a graph of torque versus time for a single switching operation. The torques provided by the mechanical flexure 44, the DC motor 60, and the magnetic latch 78, are all shown separately in FIG. 16 as a flexure torque 252, a motor torque 254, and a latch torque 256. Most of the torque provided by the motor 60 occurs in an initiating pulse 260 and a stopping pulse 262. The initiating pulse 260 is used to take the system out of the stable null 220 and past the detent hump 224. Once that has been accomplished the passive torque device 80 performs most of the work. Once the optical element arm 22 is close to the stable null 222 the stopping pulse 262 is provided by the motor 60 to slow the optical element arm 22 down so that it is finally brought to rest in the stable null 222.

FIG. 16 also shows how most of the latch torque from the magnetic latch 78 is provided near the operating positions. Near these operating extended and retracted positions the torque from the magnetic latch 78 is used to largely balance out the torque from the mechanical flexure 44.

As shown in FIG. 16, the rotary switching mechanisms 12 provides a very rapid shifting from an extended to a retracted position, or vice versa. The time for a single extension or retraction operation may be on the order of the operation time illustrated in the figure, between 0.035 and 0.04 seconds.

Figure 17:
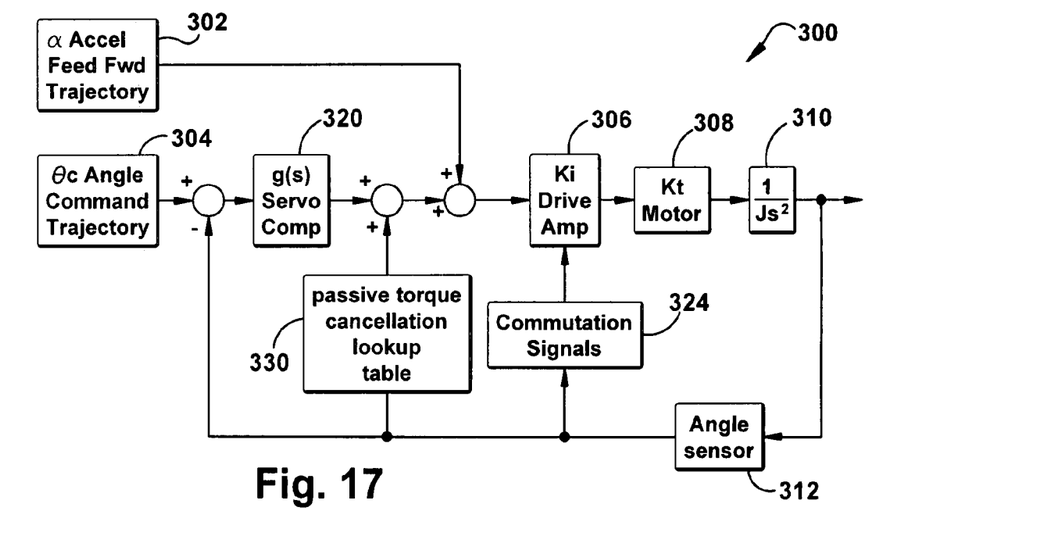
FIG. 17 is a block diagram of a control loop for the rotary switching mechanism of FIG. 3.
Figure 18:
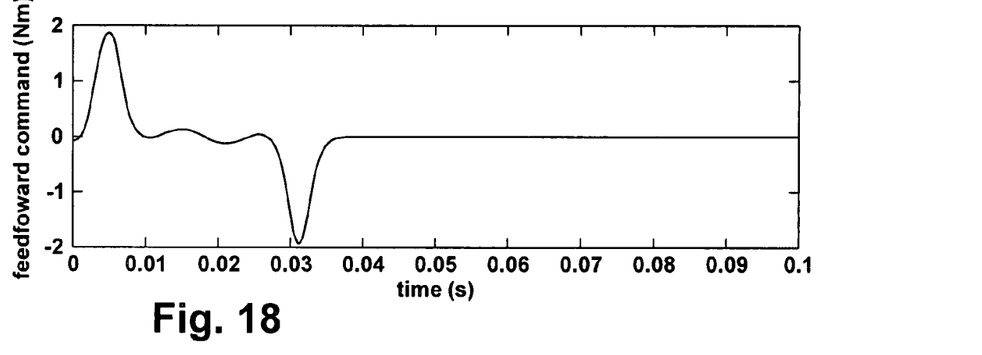
FIG. 18 is a graph showing an example of an acceleration feed forward trajectory usable with the control loop of FIG. 17.

FIG. 17 is a block diagram of the control loop 300 for control of the rotary switching mechanism 12. When a change in angle is desired, inputs are provided to the system in an acceleration feed forward trajectory 302 and an angle command trajectory 304. An example of the acceleration feed forward trajectory 302 is shown in FIG. 18. The acceleration feed forward trajectory 302 is an expected signal to be sent to the motor as a function of time.

Figure 19:
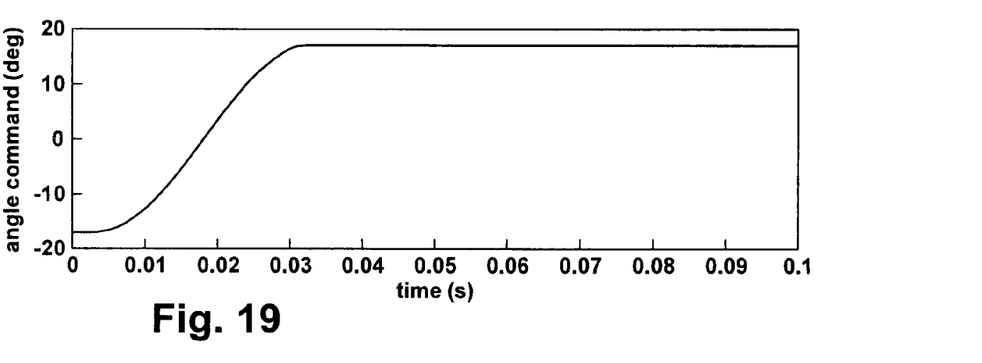
FIG. 19 is a graph showing an example of an angle command profile usable with the control loop of FIG. 17.

An example of the angle command trajectory 304 is shown in FIG. 19. This is an expected angle versus time plot for the extending or retracting operation. Both the acceleration feed forward trajectory 302 and the angle command trajectory 304 may be customized in electronics for the rotary switching mechanism 12 to take into account differences in individual rotary switching mechanisms.

The acceleration feed forward trajectory 302 is forwarded to a drive amplifier 306 with a gain $K_t$. This is modified by a motor gain 308 and an inertial term 310, to send a signal to drive the motor 60. An angle of the optical element arm 22 (FIG. 3) is detected by the eddy current sensors 32 (FIG. 3). The signal from the eddy current sensors 32 is included in the system 300 as part of a feedback loop, as illustrated by current sensor element 312. This signal indicating the actual position of the angle is combined with the angle command trajectory 304 and input into a servo compensation block 320. The input into this compensation block 320 is the difference between the expected angle and the actual angle as indicated by the eddy current sensors. The information from the eddy current sensors 32 is also used as an input for determining commutation signals 324, which are forwarded to the drive amplifier 306. This changes the amount of current provided to the motor 60 to compensate for the relative angle between the rotor and the stator of the motor 60.

The information from the eddy current sensor element 312 is also used as an input to a passive torque cancellation lookup table 330. The passive torque cancellation lookup table provides a desired motor torque versus angle profile for the motor 60. The passive torque cancellation lookup table 320 is populated based on the measured passive torque profile of the passive torque device 80. The table matches all mechanisms (all of the individual rotary switching mechanisms 12) to a common torque profile. This can be important where the system 10 (FIG. 1) is configured to always extend one of the optical elements 14 while retracting another of the optical elements 14. By use of the passive torque cancellation lookup table 330 the torques of each of the rotary switching mechanisms 12 may be equalized, so that in extending torque in one of the mechanisms is substantially equal at all times to the retracting torque in any other of the mechanisms.

The control system 300 may be modified by omitting the passive torque cancellation lookup table 330. Such a modified system would rely on the acceleration feed forward trajectory 302 and the angle command trajectory 304 to perform functions that would be performed by the passive torque cancellation lookup table 330.

The control system 300 shown in FIG. 17 may be embodied in an electronics box or an integrated circuit, using any of a variety of well-known structures. A microprocessor may be used to execute commands that are embodied in any of a wide variety of well known devices. For example, the torque lookup table 320 may be embodied in any of various memory devices, for example random access memory (RAM) or read only memory (ROM). A clock may be used as part of the control system 300 to control timing of executing various functions.

Each of the rotary switching mechanisms 12 (FIG. 1) may have its own electronics module, with an integrated circuit or other circuit board device or other electronics located in its own control electronics box. Alternatively the electronics for all of the rotary switching mechanisms 12 of the switching system 10 (FIG. 1) may be a single module. The switching system 10 may be coupled to suitable power sources in suitable control devices for sending control signals to extend and retract individual of the items 14 (FIG. 1).

The precise control of extension and retraction that can be provided by the present system is advantageous in that it may be used to minimize disturbances in the system. This may be advantageous because it avoids the large and abrupt accelerations during the latching process that occur in some prior art systems. These large and abrupt accelerations can excite resonances in the mechanism, resulting in large disturbances that can cause poor performance and/or damage to components. By controlling the latching process disturbances in the system 10 (FIG. 1) may be minimized.

The angle command trajectory 304 may be varied to change the time required for extension or retraction of the optical element 14. In an example embodiment, the angle command trajectory 304 may be set so that the extension or retraction occurs in 33 milliseconds. However, it will be appreciated that there is a large range of variations in operating times for switching mechanisms.

The present system also desirably avoids the use of rolling element bearings. Eliminating the use of bearings is advantageous in some environments, such as in cryogenic environments. Such bearings require lubricants, which may introduce contaminants into cryogenic environments. The rotary switching mechanism 12 avoids the use of such bearings and the drawbacks introduced by bearings.

Another advantage of the rotary switching mechanism 12 is that the motor 60 may be used to pull the element 14 into the retracted position in the event of a component failure or other event that may cause the moving element 14 to not properly extend into position. Thus there is no need for an auxiliary mechanism such as that which has been used in some prior art systems to pull a moving element into a retracted position, in the event of a system failure.

A further advantage of the system 10 is the low power consumption both for switching operations when no switching is occurring. Low power consumption is desirable in cryogenic environments, since power consumption leads to a need to remove heat from the cryogenic system.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rotary switching mechanism comprising:
a motor;
a passive torque device operatively coupled to the motor;
wherein the passive torque device includes:
a mechanical flexure,
a magnetic latch; and
a control loop arranged to control an operation of the motor,
wherein the passive torque device has an extended position null at an extended position and a retracted position null at a retracted position; and
wherein the passive torque device has a torque versus angle profile between the nulls that passively drives the torque device from a position adjacent to the extended position to a position adjacent to the retracted position, and vice versa, and
wherein the control loop is electrically coupled to the motor so as to either:
(1) drive the motor such that the passive torque device is moved into the extended position null from the position adjacent to the extended position and into the retracted position null from the position adjacent to the retracted position, or
(2) drive the motor such that the passive torque device is moved from the extended position null into the position adjacent to the extended position and from the retracted position null into the position adjacent to the retracted position, or
(3) not provide any drive to the motor responsive to the passive torque device being in positions other than the extended position null, the retracted position null, the position adjacent to the extended position, and the position adjacent to the retracted position.

2. The rotary switching mechanism of claim 1,
wherein the nulls are stable nulls; and
wherein the motor provides a force to overcome an extended position detent hump of the extended position null, and a retracted position detent hump of the retracted position null.

3. The rotary switching mechanism of claim 1,
wherein the nulls are unstable nulls; and
wherein the motor provides a force to maintain the passive torque device at the extended position or the retracted position.

4. The rotary switching mechanism of claim 1,
wherein the mechanical flexure has multiple segments, with adjacent of the segments rotating relative to one another; and
wherein the mechanical flexure has multiple foils.

5. The rotary switching mechanism of claim 4,
wherein the multiple segments include a top segment, a middle segment, and a bottom segment; and
wherein the mechanical flexure further includes:
an upper hexfoil foil configuration linking the top portion and the middle portion; and
a lower hexfoil foil configuration linking the middle portion and the bottom portion.

6. The rotary switching mechanism of claim 4,
wherein the multiple segments include a top segment, a middle segment, and a bottom segment; and
wherein the motor is mechanically coupled to the middle segment of the mechanical flexure, to rotate the middle segment relative to the top segment and the bottom segment.

7. The rotary switching mechanism of claim 1, wherein the mechanical flexure maintains a substantially invariant central axis location under rotation.

8. The rotary switching mechanism of claim 1, wherein the motor is a brushless DC motor.

9. The rotary switching mechanism of claim 1,
wherein a moving part of the switching mechanism rotates relative to a stationary part of the switching mechanism between an extended position and a retracted position;
wherein the moving switch part includes:
a moving flexure portion of the mechanical flexure; and
a rotor of the magnetic latch; and
wherein the stationary switch part includes:
a stationary flexure portion of the mechanical flexure; and
a stator of the magnetic latch.

10. The rotary switching mechanism of claim 9, wherein the rotor includes rotor pole pieces circumferentially spaced along a rotor ring.

11. The rotary switching mechanism of claim 10, wherein the rotor pole pieces are adjustably mounted to the rotor ring using slots in the rotor ring.

12. The rotary switching mechanism of claim 10, wherein the stator includes circumferentially-spaced magnetic assemblies.

13. The rotary switching mechanism of claim 1, wherein the control loop includes a passive torque cancellation table that provides an individualized torque versus angle profile for the motor.

14. The rotary switching mechanism of claim 1,
further comprising an angle sensor;
wherein the control loop is a closed loop that includes, as an input, an angle measurement obtained from the angle sensor.

15. The rotary switching mechanism of claim 14,
wherein the angle sensor includes an eddy current sensor that operatively interacts with an annular wedge plate;
wherein one of the switch parts includes the eddy current sensor; and
wherein the other of the switch parts includes the annular wedge plate.

16. The rotary switching mechanism of claim 1, wherein the rotary switching mechanism is a part of a switching system that includes other rotary switching mechanisms.

17. The rotary switching mechanism of claim 1, in combination with an optical element that is selectably rotated by the rotary switching mechanism.

18. A rotary switching system comprising:
multiple rotary switching mechanisms, wherein each of the rotary switching mechanisms includes:
a motor;
a control loop electrically coupled to the motor for controlling an operation thereof; and
a passive torque device operatively coupled to the motor;
wherein the passive torque device includes:
a mechanical flexure; and
a magnetic latch;
wherein the passive torque device has an extended position null at an extended position and a retracted position null at a retracted position; and
wherein the passive torque device has a torque versus angle profile between the nulls that passively drives the torque device from a position adjacent to the extended position to a position adjacent to the retracted position, and vice versa;
wherein the control loop is arranged to either:
(1) drive the motor such that the passive torque device is moved into the extended position null from the position adjacent to the extended position and into the retracted position null from the position adjacent to the retracted position, or
(2) drive the motor such that the passive torque device is moved from the extended position null into the position adjacent to the extended position and from the retracted position null into the position adjacent to the retracted position, or
(3) not provide any drive to the motor responsive to the passive torque device being in positions other than the extended position null, the retracted position null, the position adjacent to the extended position, and the position adjacent to the retracted position,
wherein the rotary switching mechanisms are coupled to respective optical elements such that the optical elements can be selectively extended into an optical path; and
wherein the rotary switching mechanisms are configured to retract one of the rotary switching mechanisms when another of the rotary switching mechanisms is deployed.

19. The rotary switching system of claim 18, wherein the control loop includes a passive torque cancellation table that provides an individualized torque versus angle profile for the motor.

* * * * *